United States Patent [19]
Ohkouchi et al.

[11] Patent Number: 5,132,814
[45] Date of Patent: Jul. 21, 1992

[54] LIQUID CRYSTAL SPATIAL LIGHT MODULATOR WITH MULTILAYER PHOTOCONDUCTOR

[75] Inventors: Nozomu Ohkouchi, Yokosuka; Shigeo Shimizu, Yokohama; Hiromitsu Takenaka, Yokosuka; Toshio Konno, Hoya, all of Japan

[73] Assignee: Victor Company of Japan, Ltd., Yokohama, Japan

[21] Appl. No.: 647,131

[22] Filed: Jan. 25, 1991

[30] Foreign Application Priority Data

Jan. 26, 1990 [JP] Japan .................................. 2-17454
Jan. 30, 1990 [JP] Japan .................................. 2-19478

[51] Int. Cl.$^5$ .............................................. G02F 1/135
[52] U.S. Cl. ......................................... 359/51; 359/72
[58] Field of Search ............... 350/342, 331 R, 339 R; 359/51, 72

[56] References Cited

U.S. PATENT DOCUMENTS

| | | | |
|---|---|---|---|
| 4,538,884 | 9/1985 | Masaki | 350/342 X |
| 4,688,900 | 8/1987 | Doane et al. | 350/347 V |
| 4,941,735 | 7/1990 | Moddel et al. | 350/342 |
| 4,944,576 | 7/1990 | Lacker et al. | 350/334 |

FOREIGN PATENT DOCUMENTS 64-38723 2/1989 Japan .
2-93519 4/1990 Japan .

OTHER PUBLICATIONS

K. Takizawa et al., "Reflection Mode Spatial Light Modulator Using Polymer-Dispersed Liquid Crystal and Bsocrystal", Applied Physics Society, Autumn 1989, 28P-2D-6.

N. Kato et al., "Optical Pattern Recognition with LAP-S-SLM", Autumn 1989, 27A-2F-2.

D. Williams et al., "An Amorphous Silicon/Chiral Smectic Spatial Light Modulator", J. Phys. D: Appl. Phys. 21 (1988) S 156-159.

G. Moddel et al., "High-Speed Binary Optically Addressed Spatial Light Modulator", Appl. Phys. Lett. 55(6) (1989) pp. 537-539.

J. Grinberg et al., "Photoactivated Birefringent Liquid-Crystal Light Valve for Color Symbology Display", IEEE Trans. on Electron Device: Ed 22, No. 9 (1975) pp. 775-783.

*Primary Examiner*—Stanley D. Miller
*Assistant Examiner*—Ron Trice
*Attorney, Agent, or Firm*—Michael N. Meller

[57] ABSTRACT

A spatial-light modulator provided with a first electrode formed by a transparent member that receives irradiation of write light corresponding to an optical image in order to form a charge image; a second electrode formed by a transparent member to receive read light irradiated in order to read a formed charge image and to discharge output light equivalent to a read charge image; an optical modulation layer provided to the first electrode side of the second electrode and formed by polymer dispersed liquid crystal material in order to change the intensity distribution of the read light irradiated via the second electrode in accordance with an electrical field intensity distribution due to the charge image; a photoconductive member provided between the first electrode and the optical modulation layer, formed with two different materials of at least amorphous silicon carbide and amorphous silicon as the primary components, and formed in a plural number of layers and having a laminated structure having an optical sensitivity that differs between the first electrode side and the second electrode side; and a dielectric mirror provided between the optical modulation layer and the photoconductive member, that reflects the read light modulated by the optical modulator in the direction of irradiation, and performs the reading of the charge image.

6 Claims, 7 Drawing Sheets

LIQUID CRYSTAL SPATIAL LIGHT MODULATOR WITH MULTILAYER PHOTOCONDUCTOR

BACKGROUND OF THE INVENTION

The present invention relates to optical information conversion processing and in particular, relates to an improved spatial-light modulator suitable for display and the analog parallel processing of moving and still pictures.

In recent years, there have been expectations for a spatial-light modulator that operates at a high speed and that has a fast response, as a device for the processing and display of optical information such as images and the like.

Figure 1A:
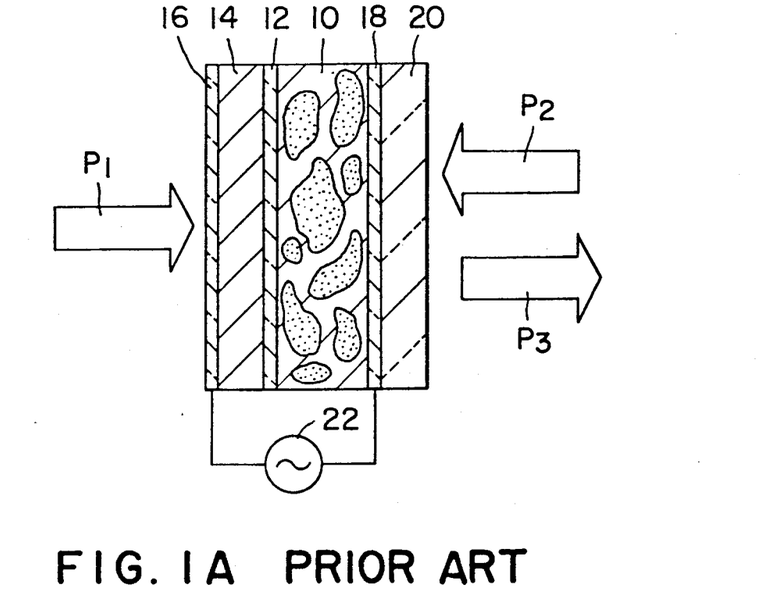
FIG. 1A is a sectional view showing a first spatial-light modulator as one example of the prior art.
Figure 1B:
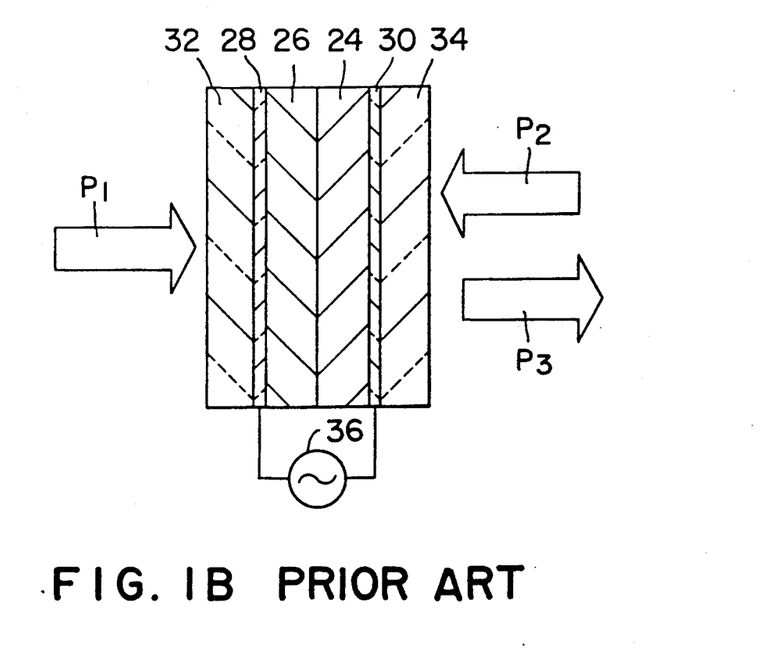
FIG. 1B is a sectional view showing a second spatial-light modulator as one example of the prior art.

A conventional spatial-light modulator is shown in FIG. 1A and 1B, for example. The description of this conventional spatial-light modulator will start with reference to FIG. 1A. This spatial-light modulator was presented at the Autumn, 1989 meeting of the Applied Physics Society. In the figure, a dielectric mirror 12 is sandwiched between a photoconductive unit 14 by BSO and a polymer dispersed liquid crystal unit 10 comprising a polymer and a nematic liquid crystal. Then, these are sandwiched between transparent electrodes 16 and 18 by ITO and to the side of the transparent electrode 18 is laminated a glass substrate 20. Between the transparent electrodes 16 and 18 is connected a power supply 22 for drive.

When there is information write, the write light P1 such as that from an argon (Ar) laser or the like, is irradiated with respect to the photoconductive unit 14 as shown by the arrow in the diagram (the direction to the right, on the left side), and the optical information that is included in the laser light is stored as electrical charges. On the other hand, the read light $P_2$ such as that of a helium-neon (He-Ne) laser or the like is irradiated to the liquid crystal compound unit 10 as shown by the arrow (direction to the left). This liquid crystal compound unit 10 is influenced by the electric field due to the electrical charge of the photoconductive unit 14. Because of this, the read light $P_2$ receives considerable modulation due to the electrical charge. This read light $P_2$ is reflected by the dielectric mirror 12 and is output as the output light $P_3$ as shown by the arrow (right direction on the right side).

FIG. 1B shows a spatial-light modulator that was disclosed in the text of J. Phys. D: Appl. Phys. 21 (1988) S156-159/ECOOSA'88 of GEC Research Ltd. & STC Technology Ltd. In the figure, hydrogenated amorphous silicon (hereinafter termed "a-Si:H") is used to laminate a photoconductive unit 26 to the optical modulator unit 24 that comprises a smectic liquid crystal and they are sandwiched by a transparent electrodes 28 and 30 of indium-tin oxide. To the outer sides of the transparent electrodes 28 and 30 are laminated glass substrates 32 and 34. Then, a power source 36 for drive is connected across the transparent electrodes 28 and 30. The procedures for information write and read are the same as for the conventional example shown in FIG. 1A.

Figure 2A:
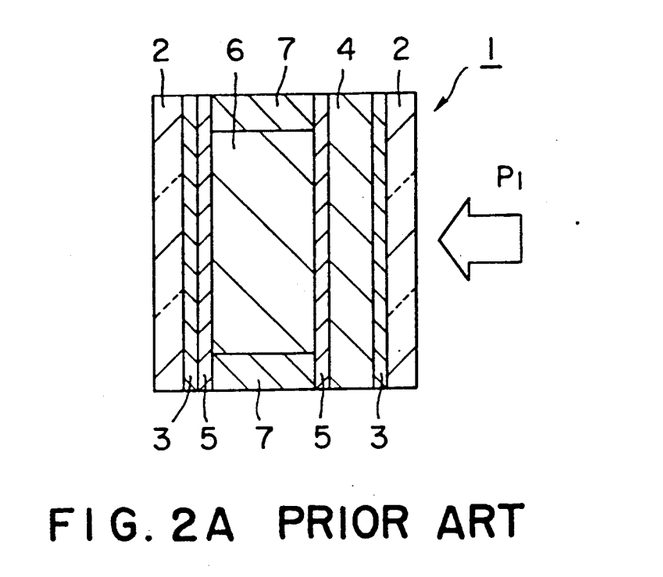
FIG. 2A is a sectional view showing a third spatial-light modulator as one example of the prior art.

Another example of a conventional spatial-light modulator is a ferroelectric liquid crystal spatial-light modulator that is shown in FIG. 2A, and this is disclosed in a paper "27a-ZF-2" of the Applied Physics Society Technology Presentations of Autumn, 1989, as "Optical Pattern Recognition with LAPS-SLM (I): Optical-write type of ferroelectric liquid crystal light valve".

As shown in the same figure, this ferroelectric liquid crystal spatial-light modulator 1 has in sequence from the right side of the figure which is the side that irradiates the write light P1, a glass layer 2, an ITO electrode layer 3, a hydrogenated amorphous silicon (a-Si:H) single-layer photoconductive unit 4, an alignment film layer 5, a liquid crystal layer 6, an alignment film layer 5, an ITO electrode layer 3 and a glass layer 2, and between these alignmentd film layers 5, 5 is a spatial-light modulator with a laminated structure inserted between the spacers 7, 7. Here, there is a hydrogenated amorphous silicon (a-Si:H) single-layer photoconductive unit 4 and a liquid crystal layer 6 between the ITO electrode layers 3, 3.

Figure 2B:
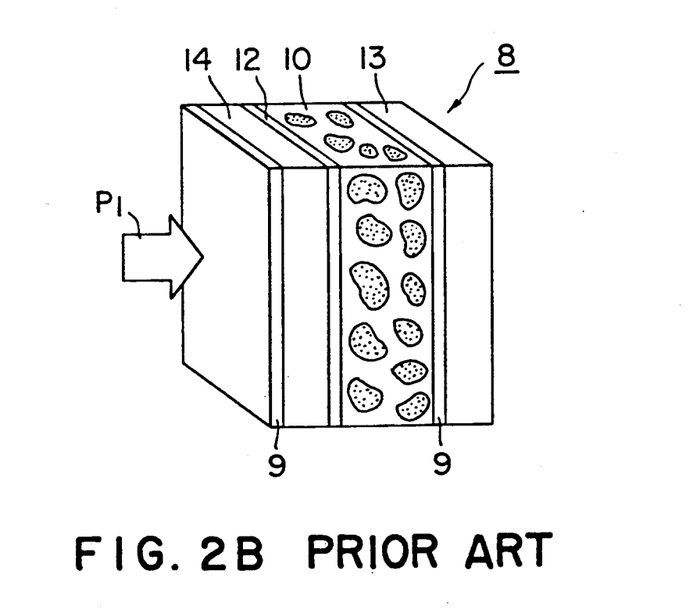
FIG. 2B is a sectional view showing a fourth spatial-light modulator as one example of the prior art.

In addition, another reflection type of spatial-light modulator shown in FIG. 2B, is disclosed in "28p-ZD-6" of the Applied Physics Society Technology Presentations of Autumn, 1989, as "Reflection made spatial-light modulator using a polymer-dispersed liquid crystal and BSO crystal (I)".

As shown in the same figure, this reflective type spatial-light modulator 8 has in sequence from the left side of the figure which is the side from which the write light $P_1$ is irradiated, a photoconductive crystal layer 14 of $Bi_{12}SiO_{20}$ (BSO), a transparent electrode 9 of ITO, a dielectric multi-layer mirror layer 12, a liquid crystal compound layer 10 comprising a polymer and a nematic liquid crystal, an ITO electrode layer 9 and a glass substrate 13 which are laminated to form the spatial-light modulator.

However, there are the following problems in such conventional technology as has been described above.

(1) In the conventional technology shown in FIG. 1A, BSO is used as the photoconductive crystal layer 14 and so it is necessary to have high-precision grinding in the process for the manufacture of the element. In addition, BSO is a crystal material and so it is difficult to have large surface areas and the manufacturing cost is also high. In addition, when the read light is strong, this read light reaches the photoconductive crystal layer 14 after passing the dielectric mirror 12 and the charge image is dispersed to deteriorate the resolution and the contrast ratio of the read image.

(2) Next, in the conventional example shown in FIG. 1B, a-Si is used as the photo-conductive unit 26 and so it is easily manufactured with large areas. However, when a strong write light is irradiated to the photoconductive unit 26, the hydrogen (H) is separated and the configuration changes to cause deterioration of the photo-conductive unit 26 and cause "burning" of the image.

(3) The BSO photoconductive crystal layer 14 of the reflective type spatial-light modulator 8 and the hydrogenated amorphous silicon (a-Si:H) single-layer photoconductive unit 4 of the conventional spatial-light modulator 1 both have a small xerographic sensitivity (hereinafter referred to as the sensitivity) in the long wavelength region of the write light $P_1$ (incident light) and so the intensity of the write light $P_1$ must be made strong but when the intensity of the write light $P_1$ is intensified, there is the problem of this causing a lowering of the contrast ratio in the read image obtained.

(4) Here, although it is not indicated in the diagram, there is a laminated structure the same as that of the conventional ferroelectric liquid crystal spatial-light modulator 1 and the reflective type spatial-light modulator 8 shown in FIG. 2A and FIG. 2B, and when the hydrogenated amorphous silicon (a-Si:H) single-layer photoconductive unit 4 and the photoconductive crystal layer 14 are used in photoconductive layers having different configurations (such as a photoconductive layer comprised of laminations of a hydrogenated amorphous silicon layer and another photoconductive layer), a boundary surface is created between the two layers and the response speed of the spatial-light modulator drops as a result of the drop in mobility of the charge that occurs inside the photoconductive layer in accordance with the write light $P_1$ and this causes the problem that it is not possible to continuously and clearly process images of objects moving rapidly.

SUMMARY OF THE INVENTION

In the light of the problems described above, the present invention has as an object the provision of a favorable spatial-light modulator that has a large area and that enables an improvement in the contrast ratio and the resolution of the read image, and without the generation of deterioration.

In addition, another object of the present invention is to provide a spatial-light modulator that can continuously and clearly process subjects having fast motion.

In order to attain these objectives, one of the embodiments of the present invention is configured from a spatial-light modulator that is configured so as to have a laminated structure of a photoconductive unit that forms a charge image corresponding to an irradiated optical image and an optical modulator that performs optical modulation in accordance with this charge image, and wherein said photoconductive unit is characterized in being provided with a first photoconductive layer formed on a irradiation side of said optical image and having amorphous silicon carbide as a primary component, and a second photoconductive layer formed on a side of said optical conversion unit and having amorphous silicon as a primary component.

Another embodiment of the present invention is characterized in being the previous invention to which a third photoconductive layer is formed on the side of the conversion unit of said second photoconductive layer and which has amorphous silicon carbide as the primary component.

A first aspect of this invention is a spatial-light modulator having a configuration which is provided with a laminated structure having a photoconductive portion member layer, a dielectric mirror layer and a optical conversion layer between a transparent electrode layer on a side of write light and a transparent electrode layer on a side of read light, so as to provide a spatial-light modulator wherein at least one of hydrogenated amorphous silicon and amorphous silicon carbide is used as the said photoconductive member layer, and wherein the composition of a connection portion of said hydrogenated amorphous silicon and said hydrogenated amorphous silicon carbide continuously changes.

A second aspect of this invention is to provide the first aspect of this invention, wherein hydrogenated amorphous silicon is sandwiched between hydrogenated amorphous silicon carbide to form said photoconductive member layer, and wherein the composition of a connection portion of said hydrogenated amorphous silicon and said hydrogenated amorphous silicon carbide continuously changes.

A third aspect of this invention is to provide a spatial-light modulator having a configuration provided with a laminated structure having a photoconductive portion member layer, a dielectric mirror layer and a optical conversion layer between a transparent electrode layer on a side of write light and a transparent electrode layer on a side of read light, and characterized in that said photoconductive member layer is formed by the successive lamination from the side of the transparent electrode layer of said write light, of hydrogenated amorphous silicon-germanium, hydrogenated amorphous silicon and hydrogenated amorphous silicon carbide.

A fourth aspect of this invention is to provide the spatial-light modulator of the third aspect of this invention, and which is characterized in being provided with a four-layer structure of hydrogenated amorphous silicon carbide, hydrogenated amorphous silicon-germanium, hydrogenated amorphous silicon and amorphous silicon carbide hydride connected to a transparent electrode layer on the side of said write light, as said photoconductive member layer.

It is possible to conceive of a spatial-light modulator wherein as said photoconductive member layer of the spatial-light modulator of the third aspect of the present invention, there is a continuous change of the composition of a first connection portion between said hydrogenated amorphous silicon-germanium and said hydrogenated amorphous silicon and wherein there is a continuous change of the composition of a second connection portion between said hydrogenated amorphous silicon and said hydrogenated amorphous silicon carbide.

According to the present invention, the first photoconductive layer absorbs one portion of the irradiated write light, and so only the remaining light is irradiated to the second photoconductive layer. In addition, the read light that would pass to the photoconductive unit is absorbed by the third photoconductive layer and so there is no influence to the second photoconductive layer.

There are the following effects according to the present invention having the characteristics that have been described above.

(1) A first photoconductive layer having amorphous silicon carbide as the primary component is provided to the side of the write light irradiation of the photoconductive unit and so the optical deterioration of the second photoconductive layer having amorphous silicon as the primary component is successfully prevented.

(2) A third photoconductive layer having amorphous silicon carbide as the primary component is provided to the side of read light irradiation of the photoconductive unit and so the progress of the read light to the second photoconductive layer is prevented and the resolution and the contrast ratio of the read image is improved.

(3) The spatial-light modulator according to the present invention and having the configuration described above provides a higher sensitivity, higher resolution and a higher contrast ratio when compared to a conventional spatial-light modulator and furthermore, the composition of the connection portion of the amorphous silicon and the hydrogenated amorphous silicon carbide changes continuously and so there is a high-speed response.

(4) Also, on the side of the write light are successively laminated hydrogenated amorphous silicon germanium, hydrogenated amorphous silicon, and amorphous silicon carbide hydride as the photoconductive member which is the main portion of the spatial-light modulator of the present invention and enables a high sensitivity, high resolution and a high contrast ratio.

(5) Furthermore, on the side of the write light are successively laminated hydrogenated amorphous silicon germanium, amorphous silicon hydride, and hydrogenated amorphous silicon carbide as the photoconductive member which is the main portion of the spatial-light modulator of the present invention and there is a continuous change in the composition of the first connection portion between the hydrogenated amorphous silicon-germanium and the hydrogenated amorphous silicon and there is a continuous change in the composition of the second connection portion between the hydrogenated amorphous silicon and the hydrogenated amorphous silicon carbide and this allows a high sensitivity, high resolution, a high contrast ratio and a high response speed to be obtained.

(6) Still furthermore, the photoconductive member layer which is a main portion of the spatial-light modulator of the present invention has a high sensitivity and so a semiconductor laser can be used to permit devices using the spatial-light modulator to be made more compact.

BRIEF DESCRIPTION OF THE DRAWINGS

In the appended drawings.

DETAILED DESCRIPTION OF THE PREFERRED EMBODIMENTS

The following is a description of an embodiment of a spatial-light modulator relating to the present invention, with reference to the appended drawings.

First embodiment

Figure 3:
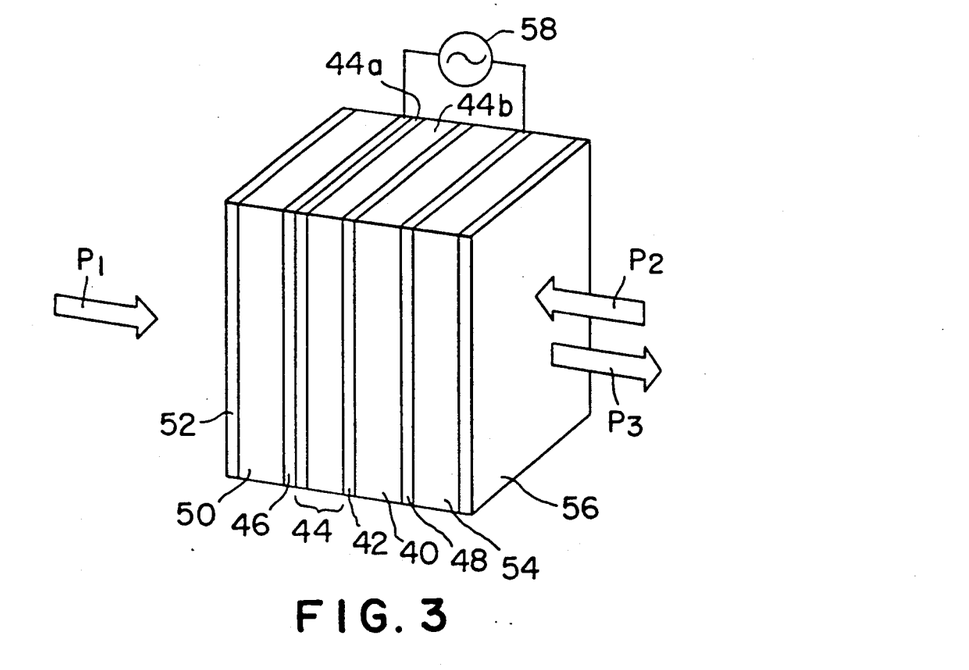
FIGS. 3 and 4 are respectively, an outline perspective view and a characteristics view indicating a spatial-light modulator according to a first embodiment of the present invention.
Figure 4:
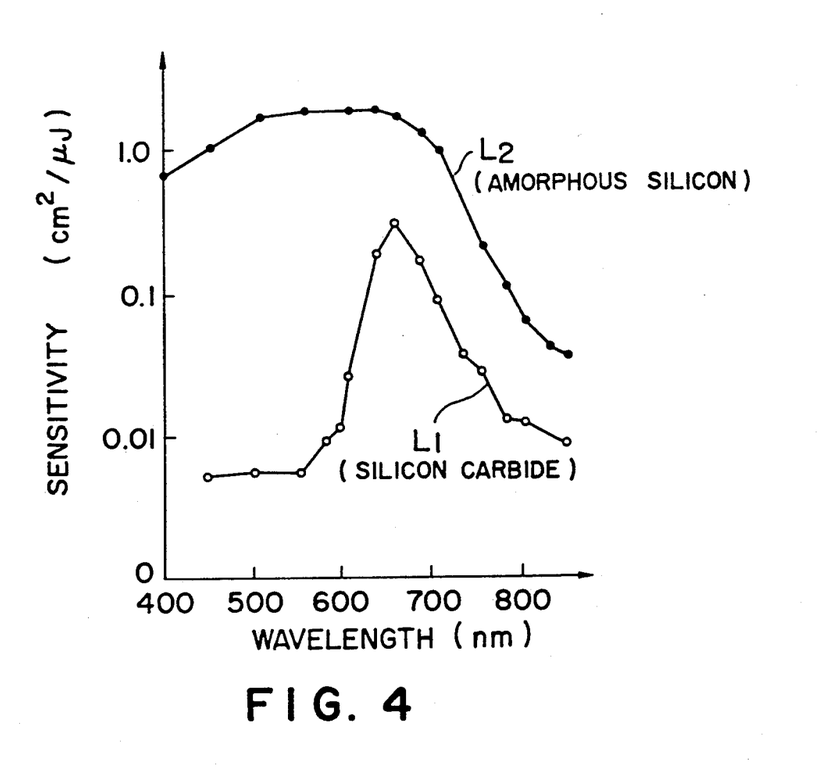

The description will commence from the first embodiment of the present invention, with reference to FIG. 3 and FIG. 4. FIG. 3 shows the configuration of a first embodiment. In FIG. 3, the side of the irradiated write light of the optical modulating member 40 comprising liquid crystal and the like, is provided with a lamination of a dielectric mirror 42 and photoconductor unit 44. These optical modulating member 40, dielectric mirror 42 and photoconductor unit 44 are sandwiched between transparent electrodes 46 and 48. The side of the write light incident to the transparent electrode 46 is formed with a glass substrate 50 and an anti-reflection film 52 successively laminated. In addition, to the side of the read light incident to the transparent electrode 48 is formed with a glass substrate 54 and an anti-reflection film 56 successively laminated.

More specifically, to the two glass substrates 50 and 54 are respectively laminated the transparent electrodes 46 and 48 and the anti-reflection films 52 and 56, and the optical modulating member 40, the dielectric mirror 42 and the photoconductor unit 44 are sandwiched between these two glass substrates 50 and 54.

Of the portions described above, the optical modulating member 40 is for example, polymer dispersed liquid crystal film that changes the intensity status of the read light in accordance with the intensity distribution of the electrical field which is applied. In addition, the transparent electrodes 46 and 48 are of ITO (indium-tin oxide) for example. These transparent electrodes 46 and 48 are connected to a power source 58 that supplies an AC voltage for drive.

As indicated in the same diagram, the photoconductor unit 44 is configured from a first photoconductive layer 44a of "a-Si$_{1-x}$C$_x$:H" (hydrogenated amorphous silicon carbide, where $0<x<1$) formed on the side of the incident write light, and a second photoconductive layer 44b of "a-Si:H" formed after it.

Of these layers, the first photoconductive layer 44a is formed, for example, by the plasma CVD method. More specifically, layer formation is performed by flowing C$_2$H$_2$ gas at a proportion of 1 cc, with respect to 15 cc SiH$_4$ gas. By this, it is possible to obtain a film having a high volume resistivity of more than "$3 \times 10^{12}\Omega \cdot$ cm", and a sensitivity only to light of a specific wavelength band. (This will be described later.)

On the other hand, the second photoconductive layer 44b is also formed by the plasma CVD method in the same manner, for example, by performing boron doping to 5-10 ppm to produce a film having a high volume resistivity of about $10^{12}\Omega \cdot$cm.

FIG. 4 shows the sensitivity of the first photoconductive layer 44a and the second photoconductive layer 44b formed in the manner described above. In the diagram, graph L$_1$ is the sensitivity characteristic of the first photoconductive layer 44a and graph L$_2$ is the sensitivity characteristic of the second photoconductive layer 44b. As is shown in these graphs, the first photoconductive layer 44a has a sensitivity peak in the vicinity of 650 nm. However, overall, the sensitivity of the second photoconductive layer 44b is better than that of the first photoconductive layer 44a.

The following is a description of the operation of a first embodiment having the configuration described above. The write light $P_1$ irradiated to the spatial-light modulator shown in FIG. 3 in the direction indicated by the arrow (the direction to the right) passes through the anti-reflection film 52, the glass substrate 50 and the transparent electrode 46 and reaches the photoconductor unit 44. When this occurs, the value of the electrical resistance of the photoconductor unit 44 changes in accordance with the optical intensity due to the incident light that reaches it. In other words, an electron-hole pair is formed by the write light, and this separation is performed. The separated charge reaches the boundary surface of the photoconductor unit 44 and the dielectric mirror 42 and the charge image corresponding to the optical image due to the write light that reaches the photoconductor unit 44 forms on that boundary surface.

The write light that is incident to the photoconductor unit 44 is first irradiated to the first photoconductive layer 44a where first-stage light absorption is performed. Then, the remaining write light is irradiated to the second photoconductive layer 44b where second-stage light absorption is performed. Because of this, the light that is irradiated to the second photoconductive layer 44b is only one portion and not all of the irradiated write light and so the generation of deterioration due to the irradiation of a strong write light is reduced.

In addition, there is absorption of the write light and the generation and separation of the charge in both the first photoconductive layer 44a and the second photoconductive layer 44b and so the charge image is generated very efficiently.

Following this, the electrical field due to the charge image that is generated in this manner operates on the optical modulating member 40 via the dielectric mirror 42. The intensity distribution of this electrical field corresponds to the distribution of the charge image, that is, the optical image of the write light. In this status, when the read light $P_2$ is projected as indicated by the arrow (in the direction of the left), the read light passes through the anti-reflection film 56, the glass substrate 54 and the transparent electrode 48 in sequence and is irradiated to the optical modulating member 40.

In the optical modulating member 40, the transmittance of the light changes in accordance with the electrical field that is acting. For example, the optical axis of the molecules in the nematic liquid crystal changes to be perpendicular to the surface of the transparent electrode 48, and this causes the transmittance of the light to change so that modulation of the irradiated read light is performed. The modulated read light is further irradiated to the dielectric mirror 42 where it is reflected and outputted as an output light $P_3$ in the direction of the arrow (emitted in the direction to the right). More specifically, the optical image information corresponding to the optical image of the object and included in the write light $P_1$ is read by the read light $P_2$.

As has been described above, according to this first embodiment, the action of the first photoconductive layer 44a favorably prevents the optical deterioration of the second photoconductor unit 44b. In addition, an amorphous material is used as the photoconductor unit 44 and so it is easily manufactured into large areas.

Second embodiment

Figure 5:
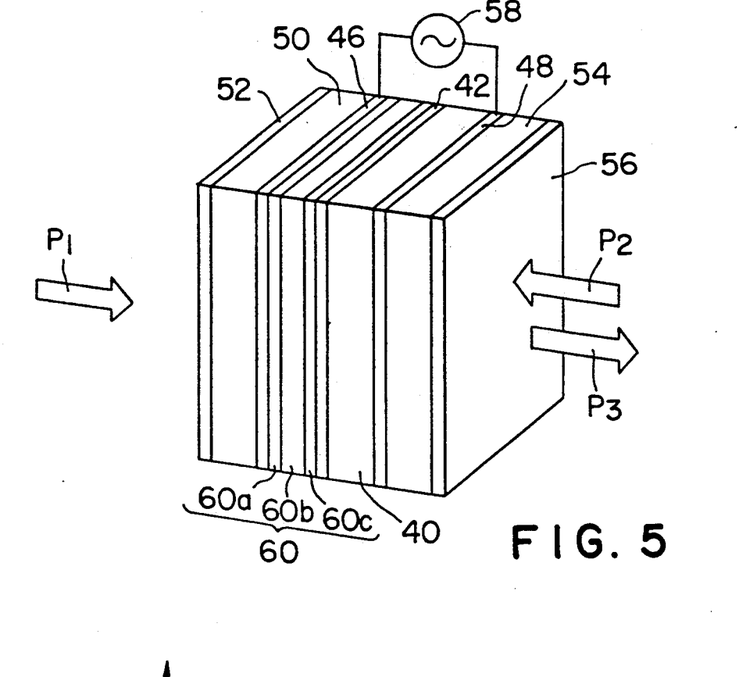
FIGS. 5 and 6 are respectively, an outline perspective view and a characteristics view indicating a spatial-light modulator according to a second embodiment of the present invention.
Figure 6:
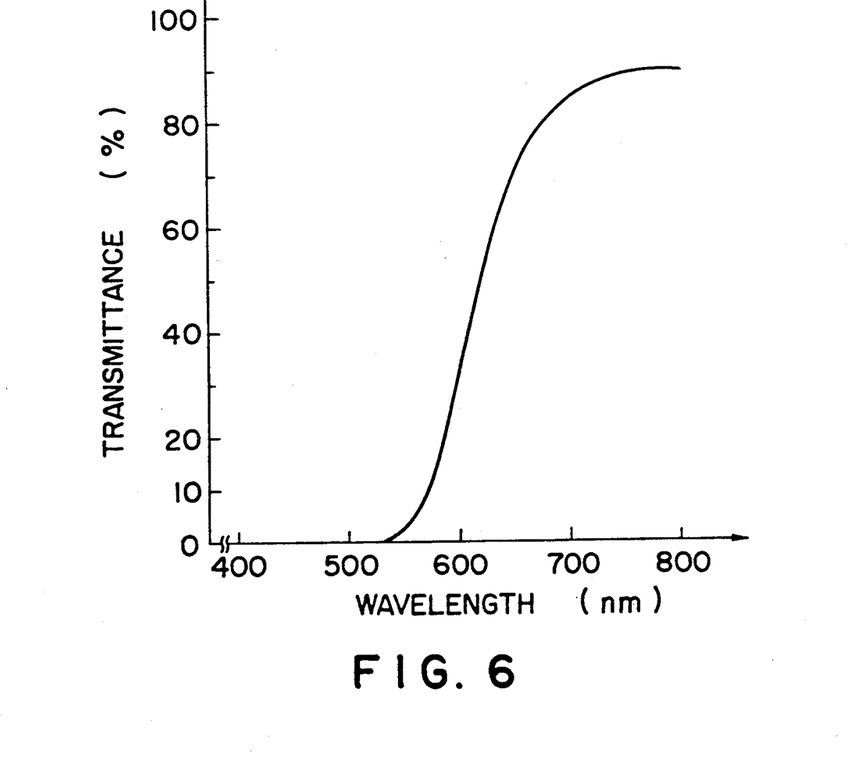

The following is a description of a second embodiment of the present invention, with reference to FIG. 5 and FIG. 6. Moreover, those portions that correspond to portions of the first embodiment, are indicated with corresponding numerals. In the second embodiment, the photoconductor unit 60 is configured from three layers. More specifically, the photoconductor unit 60 is configured from a first photoconductive layer 60a of "a-Si$_{1-x}$C$_x$:H", a second photoconductive layer 60b of "a-Si:H", and a third photoconductive layer 60c of "a-Si$_{1-x}$C$_x$:H".

The transmittance characteristic of these first and third photoconductive layers 60a and 60c is shown for example in FIG. 6 (for a film thickness of 2 μm). When this is compared to the graph $L_2$ for the second photoconductive layer 60b shown above in FIG. 4, the first and the third photoconductive layers 60a and 60c show approximately 100% absorption for 550 nm or less from among those wavelength regions to which the second photoconductive layer 60b is sensitive.

The following is a description of the operation of a second embodiment having the configuration described above. First, the generation of the charge image by the write light is the same as that for the first embodiment described above. The light of a wavelength to which the first, second and third photoconductive layers 60a, 60b and 60c are sensitive is used as the write light. By this, absorption of the write light is performed in all of the photoconductive layers in the photoconductive unit 60, and a charge image is formed so as to correspond to the irradiated optical image.

Then, the read light is modulated by the optical modulating member 40 as described above and is irradiated to the dielectric mirror 42. This read light is light of a wavelength that is prevented from passing by the third photoconductive layer 60c. One portion of the read light is not reflected by the dielectric mirror 42 and passes through to reach the photoconductive unit 60. However, it is prevented from passing by the third photoconductive layer 60c of the photoconductor unit 60. More specifically, the third photoconductive layer 60c operates as a read light blocking means. Because of this, the value of the electrical resistance of the second photoconductive unit 60b in particular, does not change due to the read light, and the charge image at the boundary surface of the photoconductor unit 60 and the dielectric mirror 42 does not change.

As has been described above, according to this second embodiment, there is a photoconductive layer 60c provided and light of a wavelength to which the "a-Si$_{1-x}$C$_x$:H" is sensitive is used as the write light and light of a wavelength to which the "a-Si$_{1-x}$C$_x$:H" is not transmissive is used as the read light so that it is possible to have the photoconductor unit 60 function as a read light blocking layer. This means that it is possible to effectively use the write light and the read light and that it is possible to have a higher resolution and contrast ratio than the conventional case where there photoconductor unit 60 is configured from only "a-Si:H"

Third embodiment

Figure 7:
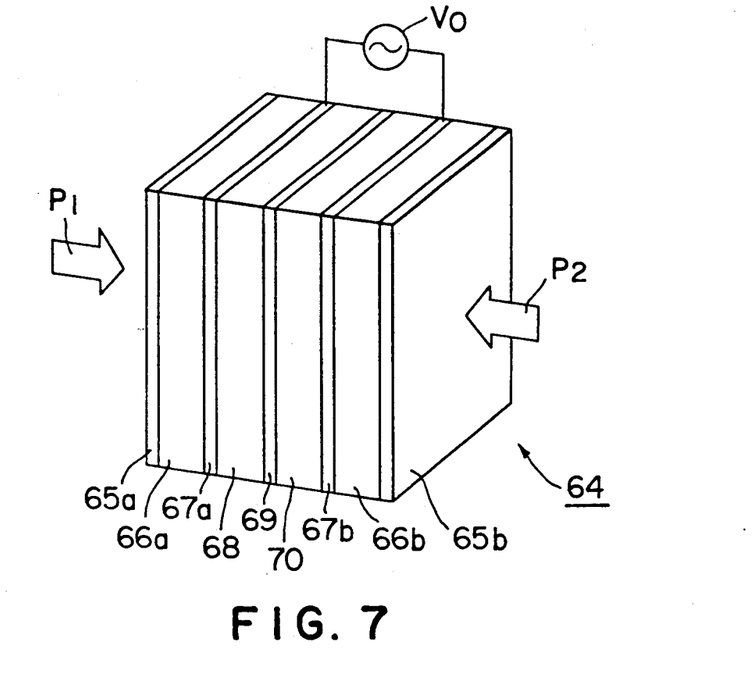
FIG. 7 is an outline perspective view indicating a spatial-light modulator according to third through seventh embodiments of the present invention.

As shown in FIG. 7, the spatial-light modulator 64 according to the present invention is a spatial-light modulator having a laminated structure where, from the side of the left of the diagram and to which the write light $P_1$ is irradiated, are successively laminated an anti-reflection layer 65a, a glass layer 66a, a transparent electrode layer 67a on the write light side, a photoconductor 68 of which value of the electrical resistance changes only by the irradiation of the write light $P_1$, a dielectric mirror layer 69, an optical modulating material layer 70 comprising PDLC film in which nematic liquid crystals are dispersed, a transparent electrode layer 67b on the read light side, a glass layer 66b, and an anti-reflection film 65b.

The photoconductive member layer 68 which is a characterizing portion of the present embodiment, is, in the same diagram, opposite the optical modulating member 70 via the dielectric mirror layer 69, and the outer surfaces of the photoconductor member layer 68 and the optical modulator layer 70 are in close contact with the transparent electrode layer 67a on the write side and the transparent electrode layer 67b on the read side. To this transparent electrode layer 67a on the write side and the transparent electrode layer 67b on the read side are applied an AC power source $V_0$.

As the photoconductive member layer 68, as will be described later, a hydrogenated amorphous silicon layer 68b and a hydrogenated amorphous silicon carbide layer (68a) 68c are used, and connection portions (68d) 68e between the amorphous silicon hydride layer 68b and the hydrogenated amorphous silicon carbide layer (68a) 68c have a continuously changing composition.

Figure 8:
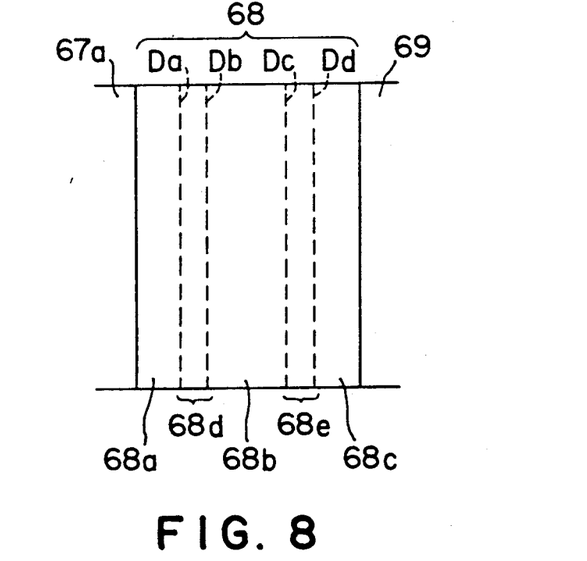
FIG. 8 is a view of a configuration of a photoconductive member layer in a spatial-light modulator of a third embodiment according to the present invention.

As shown in FIG. 8, in the third embodiment of the photoconductive member layer 68 described above, the hydrogenated amorphous silicon layer 68b is sandwiched between hydrogenated amorphous silicon carbide layers 68a and 68c, and the connection portion 68d (the portion shown by the broken line $D_a$ and the broken line $D_b$ in the same figure) between the hydrogenated amorphous silicon carbide layer 68a and the hydrogenated amorphous silicon layer 68b has the value x in the amorphous silicon carbide (a-$Si_{1-x}C_x$:H) continuously changing from a constant value within the range of "$0.1 < x < 0.5$" at the broken line $D_a$ to zero at the broken line $D_b$ so that the configuration is such that there is a continuous change in the composition of the hydrogenated amorphous silicon carbide layer 68a and the hydrogenated amorphous silicon layer 68b in the connection portion 68d.

In the same manner, the connection portion 68e (the portion shown by the broken line $D_c$ and the broken line $D_d$ in the same figure) between the hydrogenated amorphous silicon Carbide layer 68c and the hydrogenated amorphous silicon layer 68b has the value x in the amorphous silicon carbide (a-$Si_{1-x}C_x$:H) continuously changing from a constant value within the range of "$0.1 < x < 0.5$" at the broken line $D_d$ to zero at the broken line $D_c$ so that the configuration is such that there is a continuous change in the composition of the hydrogenated amorphous silicon carbide layer 68c and the hydrogenated amorphous silicon layer 68c in the connection portion 68e.

This is to say that the value of x described above for the hydrogenated amorphous silicon carbide layers 68a and 68c in the photoconductive member layer 68 described above changes as follows. More specifically, the value from the connection portion with the transparent electrode layer 67a on the write light side to the broken line $D_a$ keeps a constant value within the range of "$0.1 < x < 0.5$", and the value from the broken line $D_a$ and the broken line $D_b$ gradually reduces so that it becomes zero at the broken line $D_b$. The value is zero from the broken line $D_b$ to the broken line $D_c$ and the value gradually increases from the broken line $D_c$ to the broken line $D_d$ so that it becomes a constant value within the range of "$0.1 < x < 0.5$" at the broken line $D_d$ and keeps this constant value until the connection portion with the dielectric mirror 69.

As the result, it is possible to obtain a configuration wherein the proportion of carbon in the hydrogenated amorphous silicon carbide gradually reduces in the direction from the broken line $D_a$ to the broken line $D_b$ (from the broken line $D_d$ to the broken line $D_c$) while the proportion of silicon gradually increases.

Fourth embodiment

Figure 9:
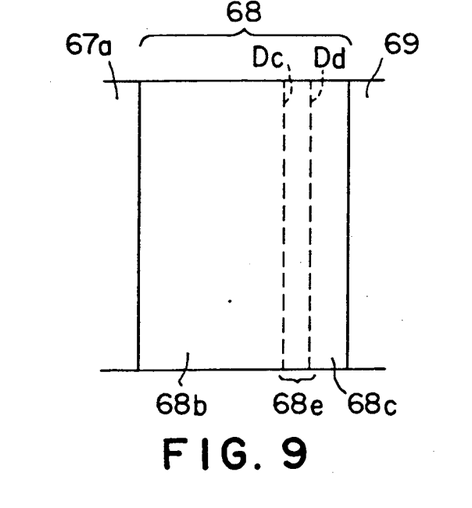
FIG. 9 is a view of a configuration of a photoconductive member layer in a spatial-light modulator of a fourth embodiment according to the present invention.

The configuration of a fourth embodiment of the photoconductive member layer 68 shown in FIG. 9, as has been described above, uses a hydrogenated amorphous silicon layer 68b and a hydrogenated amorphous silicon carbide layer 68c, and a connection portion 68e between the hydrogenated amorphous silicon layer 68b and the hydrogenated amorphous silicon carbide layer 68c has a continuously changing composition. Moreover, those portions that correspond to portions of the third embodiment, are indicated with corresponding numerals and the corresponding description of them is omitted.

Here, the value of x described above for the hydrogenated amorphous silicon carbide layer $68_c$ in the photoconductive member layer 68 described above changes as follows.

More specifically, the value from the connection portion with the transparent electrode layer 67a on the write light side to the broken line $D_c$ is zero, and the value from the broken line $D_c$ and the broken line $D_d$ gradually increases so that it becomes a constant value within the range of $0.1 < x < 0.5$ at the broken line $D_d$, and is a constant value until the connection portion with the dielectric mirror 69.

As a result, it is possible to obtain a configuration wherein the proportion of carbon in the hydrogenated amorphous silicon carbide gradually reduces in the direction from the broken line $D_d$ to the broken line $D_c$ but where the proportion of silicon gradually increases.

Operation of the third and fourth embodiments

As shown in FIG. 7, an AC voltage $V_0$ is applied beforehand between the transparent electrode layer 67b on the side of the read light and the transparent electrode layer 67a on the side of the write light so as to uniform electric field in the optical modulator layer 70.

Write of optical image information will be described first.

When write light $P_1$ corresponding to optical image information of an object (not indicated in the figure) is irradiated to the left surface of the anti-reflection layer 65a on the left side in the same figure, the write light $P_1$ passes through the anti-reflection layer 65a, the glass layer 66a, the transparent electrode layer 67a on the side of the write light $P_1$ in sequence and is then irradiated to the photoconductive member layer 68. Thus, the value of the electrical resistance in the photoconductive member layer 68 changes so as to correspond to the optical image due to the write light $P_1$, and on the side of the dielectric mirror 69 inside the photoconductive member layer 68 is formed a charge image that corresponds to the irradiated light (optical image) that reaches the photoconductive member layer 68 through the side of the transparent electrode layer 67a on the side of the write light. Then, the electrical field with an intensity distribution corresponding to the charge image is transmitted to the optical modulating member 70 via the dielectric mirror 69 and the direction of the optical axis of the molecules in the nematic liquid crystal of the optical modulator 70 changes in accordance with this intensity distribution.

Accordingly, the optical image information is converted by the optical modulating member 70 into changes in the direction of the optical axis of the molecules in the nematic liquid crystal.

The following is a description of read of the optical information.

When read light $P_2$ is irradiated from the right surface of the anti-reflection layer 65b on the right side of the same figure, the read light $P_2$ passes through the anti-reflection layer 65b, the glass layer 66b and the transparent electrode layer 67b on the side of the read light, in sequence and is then irradiated to the optical modulating member 70. In the optical modulating member 70, it passes through in accordance with the changes in the direction of the optical axis of the molecules in the nematic liquid crystal and is then irradiated to the dielectric mirror 69. This irradiated light is reflected by the dielectric mirror 69 and the optical path of the irradiated light described above is again followed reversely and is then emitted from the anti-reflection layer 65b on the right side in the same figure. The light that is not reflected by the dielectric mirror 69 passes through this and proceeds to the photoconductive member layer 68 but it completely blocked by the hydrogenated amorphous silicon carbide layer 68c that is formed on the side of the dielectric mirror 69 of the photoconductive member layer 68 and therefore does not proceed to the hydrogenated amorphous silicon layer 68b inside the photoconductive member layer 68, and the value of the electrical resistance of the photoconductive member layer 68 does not change due to the irradiation of the read light $P_2$ and so there is no change in the charge image that is formed on the side of the dielectric mirror 69 inside the photoconductive member layer 68.

Accordingly, the optical information that is converted in accordance with the changes in the direction of the optical axis of the molecules in the nematic liquid crystal is read as optical image information light.

Figure 10:
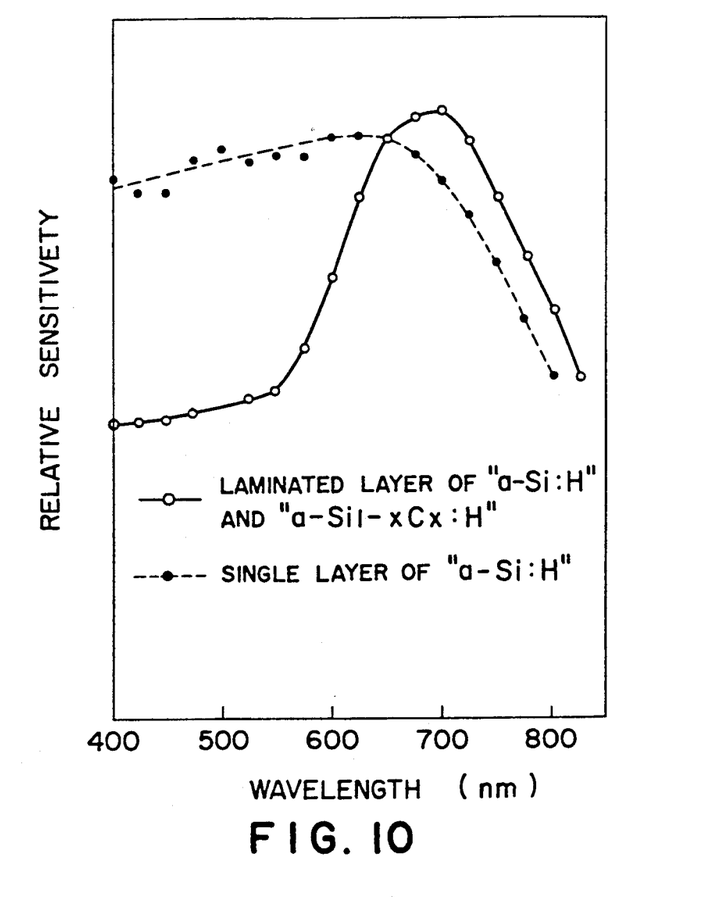
FIG. 10 is a view indicating a comparison between the spectral sensitivity curves of a unit using an amorphous silicon single layer as the photoconductive member layer of the third to seventh embodiments, and a unit using a laminated hydrogenated amorphous silicon and hydrogenated amorphous silicon carbide as the photoconductive member layer.

FIG. 10 is a view indicating a comparison between the spectral sensitivity curves of a unit using an amorphous silicon single layer as the photoconductive member layer of the third to seventh embodiments, and a unit using a laminated hydrogenated amorphous silicon and hydrogenated amorphous silicon carbide as the photoconductive member layer.

As is clear from this figure, the sensitivity of the photoconductive member layer 68 which is a laminate of hydrogenated amorphous silicon carbide and hydrogenated amorphous silicon shown by the solid line has a higher peak for the relative sensitivity when compared to the sensitivity for the case of a single layer of hydrogenated amorphous silicon (doped with a minute amount of boron in order to improve the volume resistivity) and the peak wavelength also shifts towards the side of the long-wavelength. Therefore, a light having a long wavelength such as a light of 650 nm to 750 nm for which the photoconductive member layer 68 has a high sensitivity is used as the write light $P_1$, and a light having a wavelength such as 500 nm to 600 nm which the amorphous silicon carbide layer 68c on the side of the dielectric mirror 69 blocks is used as the read light $P_2$.

Because of this, when the read of optical image information is performed, the read light $P_2$ does not change the charge image inside the hydrogenated amorphous silicon layer 68b. Accordingly, a spatial-light modulator 64 that uses a photoconductive member layer 68 that is a laminate of a hydrogenated amorphous silicon layer 68b, an amorphous silicon carbide hydride layer (68a) 68c as shown by the solid line described above can be made to have a high resolution, a high contrast ratio, a high sensitivity and a fast response speed.

Method of manufacture of the third and fourth embodiments

The following is a description of the method of manufacture of the photoconductive member layer 68.

The manufacture of the photoconductive member layer 68 shown in FIG. 8 and FIG. 9 is performed by the plasma CVD method using RF glow discharge. The hydrogenated amorphous silicon carbide layer 68a (68c) uses $SiH_4$, $C_2H_2$, $H_2$ as the raw material gas, and the hydrogenated amorphous silicon layer 68b uses $SiH_4$, $H_2$ as the raw material gas, while the portion for which the value of x continuously changes in the $Si_{1-x}C_x$ of the hydrogenated amorphous silicon carbide (a-$Si_{1-x}C_x$:H) due to the connection portion 68d (68e) with the hydrogenated amorphous silicon carbide layer 68a (68c) is manufactured by continuously changing the amount of flow of $C_2H_2$, $H_2$ gases.

In this manner, it is possible to manufacture the spatial-light modulator 64 shown in FIG. 7.

When this spatial-light modulator 64 is incorporated into an apparatus, the use of a semiconductor laser allows the resulting apparatus to be made more compact than a conventional apparatus.

More specifically, current semiconductor lasers can only produce a high output in a region of 700–800 nm or more and there is a low output for wavelengths below this region. However, as has been described above, there is a high sensitivity to light having a wavelength of 650–750 nm and so a semiconductor laser can be used to produce a higher sensitivity than a conventional device and to also allow the apparatus to be made more compact.

Figure 11:
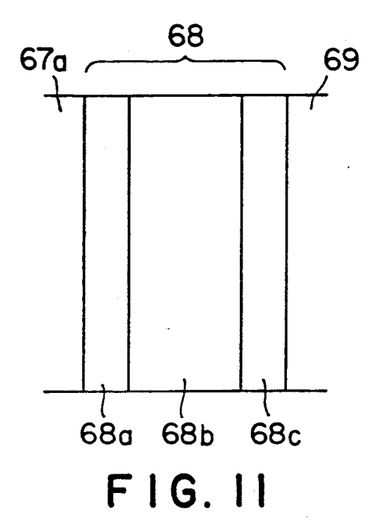
FIG. 11 is a view for describing the configuration of a photoconductive member layer of a spatial-light modulator shown in FIG. 7, for the third through seventh embodiments.

In addition, the degree of mobility of the charge that is generated inside the photoconductive member layer 68 when the write light $P_1$ is irradiated is one factor determining the speed of response of the spatial-light modulator and the presence of a boundary layer directly connecting two different members in the photoconductive member layer 68 shown in FIG. 11 lowers the degree of mobility of the charge inside the photoconductive member layer 68, but in the photoconductive member layer 68 of the spatial-light modulator 64 of the present invention, there is a continuous change for the composition of between members such as in the connecting portions 68d and 68e and so it is possible to maintain a high sensitivity in the long-wavelength region and to realize a fast response speed.

Fifth and sixth embodiments

Figure 12:
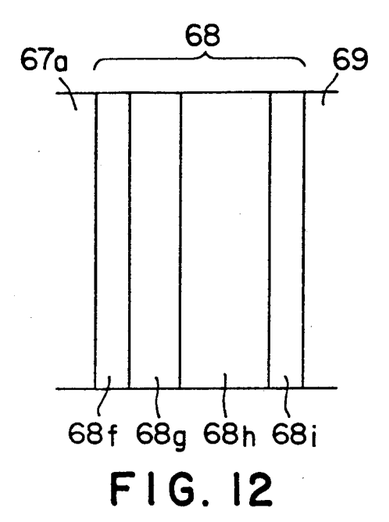
FIG. 12 through FIG. 14 are respectively, views of a configuration of the fifth, sixth and seventh embodiments, of a photoconductive member layer of a spatial-light modulator shown in FIG. 7.
Figure 13:
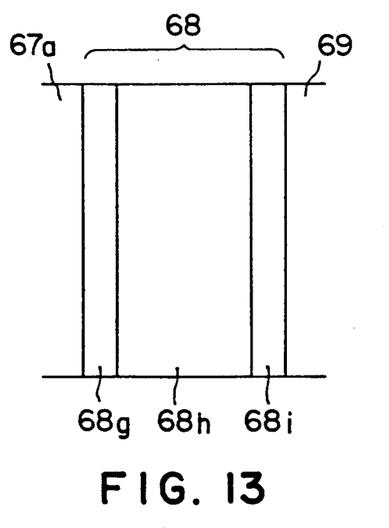

The following is a description of fifth and sixth embodiments of the photoconductive member layer 68 of the spatial-light modulator 64 shown in FIG. 7, with reference to FIG. 12 and FIG. 13.

A spatial-light modulator 64 having such a configuration is a spatial-light modulator 64 that is provided with a laminated structure of a photoconductive member layer 68, a dielectric mirror 69 and a optical modulator 70 between a transparent electrode layer 67a on the side of the write light and a transparent electrode layer 67b on the side of the read light, and the optical modulator 70 is a spatial-light modulator that is characterized in having laminated from the side of the transparent electrode layer 67a on the write side, hydrogenated amorphous silicon germanium 68g, hydrogenated amorphous silicon 68h and hydrogenated amorphous silicon carbide 68i.

The configuration of the fifth embodiment of the photoconductive member layer 68 shown in FIG. 12 has a four-layer structure of a hydrogenated amorphous silicon carbide layer (a-Si$_{1-x}$C$_x$:H) (where $0.1<x<0.5$) 68f, a hydrogenated amorphous silicon germanium layer (a-Si$_{1-y}$Ge$_y$:H) (where $0.3<y<0.7$) 68g, a hydrogenated amorphous silicon layer 68h and a hydrogenated amorphous silicon carbide layer (a-Si$_{1-x}$C$_x$:H) (where $0.1<x<0.5$) 68i.

In addition, the configuration of a sixth embodiment of the photoconductive member layer 68 shown in FIG. 13 is a three-layer structure of a hydrogenated amorphous silicon germanium layer (a-Si$_{1-y}$Ge$_y$:H) where $0.3<y<0.7$) 68g, a hydrogenated amorphous silicon layer 68h and a hydrogenated amorphous silicon carbide layer (a-Si$_{1-x}$C$_x$:H) (where $0.1<x<0.5$) 68i.

The following is a description of write and read of optical image information using the spatial-light modulator 64 having the photoconductive member layer 68 with a configuration shown in FIG. 12 and FIG. 13.

As shown in FIG. 7, an AC voltage V$_0$ is applied beforehand between the transparent electrode layer 67b on the side of the read light and the transparent electrode layer 67a on the side of the write light and a uniform electric field formed with the optical modulator layer 70, and write is performed in the same manner as the third and fourth embodiments described above.

Write of optical image information will be described first.

When write light P$_1$ corresponding to optical image information of a subject (not indicated in the figure) is irradiated to the left surface of the anti-reflection layer 65a on the left side in the same figure, the write light P$_1$ passes through the anti-reflection layer 65a, the glass layer 66a, the transparent electrode layer 67a on the side of the write light P$_1$ in sequence and is then irradiated to the photoconductive member layer 68. Thus, the value of the electrical resistance in the photoconductive member layer 68 changes so as to correspond to the optical image due to the write light P$_1$, and on the side of the dielectric mirror 69 inside the photoconductive member layer 68 is formed a charge image that corresponds to the irradiated light (optical image) that reaches the side of the transparent electrode layer 67a on the side of the write light inside the photoconductive member layer 68. Then, the electrical field with an intensity distribution corresponding to the charge image is transmitted to the optical modulator 70 via the dielectric mirror 69 and the direction of the optical axis of the molecules in the nematic liquid crystal of the optical modulator 70 changes in accordance with this intensity distribution.

Accordingly, the optical image information is converted by the optical modulator 70 into changes in the direction of the optical axis of the molecules in the nematic liquid crystal. The following is a description of read of the optical information.

When read light P$_2$ is irradiated from the right surface of the anti-reflection preventive layer 65b on the right side of the same figure, the read light P$_2$ passes through the anti-reflection layer 65b, the glass layer 66b and the transparent electrode layer 67b on the side of the read light, in sequence and is then irradiated to the optical modulator 70. In the optical modulator 70, it passes through in accordance with the changes in the direction of the optical axis of the molecules in the nematic liquid crystal and is then irradiated to the dielectric mirror 69. All of this irradiated light is reflected by the dielectric mirror 69 and the optical path of the irradiated light described above is again followed as optical image information and is then discharged from the anti-reflection layer 65b on the right side in the same figure. The light that is not reflected by the dielectric mirror 69 passes through this and proceeds to the photoconductive member layer 68 but it completely blocked by the hydrogenated amorphous silicon carbide layer 68i that is formed on the side of the dielectric mirror 69 of the photoconductive member layer 68 and therefore does not proceed to the hydrogenated amorphous silicon layer 68h inside the photoconductive member layer 68, and the value of the electrical resistance of the photoconductive member layer 68 does not change due to the irradiation of the read light P$_2$ and so there is no change in the charge image that is formed on the side of the dielectric mirror 69 inside the photoconductive member layer 68.

Accordingly, the optical information that is converted by the optical modulator 70 in accordance with the changes in the direction of the optical axis of the molecules in the nematic liquid crystal is read as optical image information light.

Then, the hydrogenated amorphous silicon germanium uses as the photoconductive member layer 68 described above has a higher sensitivity than the hydrogenated amorphous silicon in the long wavelength region and so the combined use of hydrogenated amorphous silicon and hydrogenated amorphous silicon germanium has the further effect of preventing the change of the charge image due to the irradiation of the read light P$_2$ by the hydrogenated amorphous silicon carbide and therefore enable a spatial-light modulator having a high contrast ratio and a high sensitivity.

In general, raising the sensitivity requires that the coefficient of light absorption be increased and this can be achieved by making the band gap smaller. The hydrogenated amorphous silicon germanium has a band gap of approximately 1.1 to 1.6 eV by changing the mix ratio of the SiH$_4$ and the GeH$_4$ and therefore allows a small value for the band gap to be obtained when compared to the band gap of approximately 1.7 to 1.8 eV of hydrogenated amorphous silicon.

Accordingly, it is possible to obtain a spatial-light modulator that has a higher sensitivity in the long-wavelength regions by the use of hydrogenated amorphous silicon germanium for the photoconductive member layer 68 described above.

Figure 14:
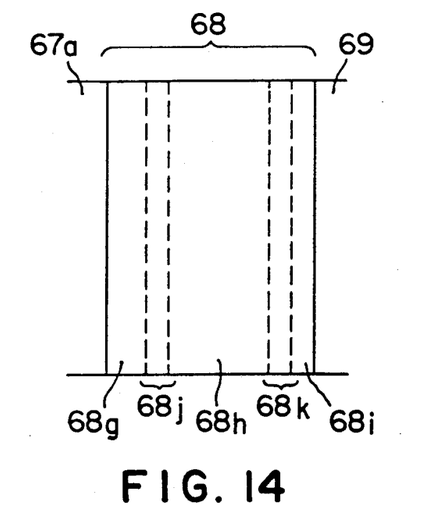

The following is a description of a seventh embodiment of the photoconductive member layer 68 of the spatial-light modulator 64 shown in FIG. 7, with reference to FIG. 14.

The spatial-light modulator 64 is a spatial-light modulator having a laminated structure where a photoconductor 68, a dielectric mirror layer 69 and an optical modulating material layer 70 are between a transparent electrode layer 67a on the write light side, and a transparent electrode layer 67b on the read light side, and the photoconductive member layer 68 has successively laminated from the side of the transparent electrode layer 67a on the write light side, a hydrogenated amorphous silicon germanium layer 68g, a hydrogenated amorphous silicon 68h, and an hydrogenated amorphous silicon carbide 68i, and the composition of a first connection portion 68j between the hydrogenated amorphous silicon germanium 68g and the hydrogenated amorphous silicon 68i continuously changes, and the composition of a second connection portion 68k between the hydrogenated amorphous silicon layer 68h and the hydrogenated amorphous silicon carbide layer 68i also changes continuously.

The first connection portion 68j between the hydrogenated amorphous silicon germanium layer (a-Si$_{1-y}$Ge$_y$:H) 68g and the hydrogenated amorphous silicon 68h has the value for y in Si$_{1-y}$Ge$_y$ continuously changing from a constant value in the range 0.3<y<0.7 to zero, and in the second connection portion 68k between the hydrogenated amorphous silicon layer 68h and the hydrogenated amorphous silicon carbide layer (a-Si$_{1-x}$C$_x$:H) 68i has the value for x in Si$_{1-x}$C$_x$ continuously changing from a constant value in the range 0.1<x<0.5 to zero, so that if a configuration where the composition of the hydrogenated amorphous silicon germanium layer 68g and the hydrogenated amorphous silicon layer 68h continuously changes and where the composition of the hydrogenated amorphous silicon layer 68h and the hydrogenated amorphous silicon carbide layer 68i continuously changes, is adopted, then the boundary surfaces such as in the sixth configuration shown in FIG. 13 (the boundary surface between the hydrogenated amorphous silicon germanium layer 68g and the hydrogenated amorphous silicon layer 68h and the boundary surface between the hydrogenated amorphous silicon layer 68h and the hydrogenated amorphous silicon carbide layer 68i) are eliminated and it is possible to improve the response speed and to have a high sensitivity in addition to the effects that have already been described.

In addition, although it is not shown in the figures, it is also possible to eliminate the boundary surface between the hydrogenated amorphous silicon layer 68h and the amorphous silicon carbide hydride layer 68i, and the boundary surface between the hydrogenated amorphous silicon layer 68h and the hydrogenated amorphous silicon germanium layer 68g in the photoconductive member layer 68 shown in FIG. 12.

Other embodiments

Moreover, the present invention is not limited to the embodiments described above, as for example, the ratio between the Si and the C in the a-Si$_{1-x}$C$_x$:H can be set appropriately according to necessity. However, if x, that is, the proportion of C, is made large, the film becomes transparent and it is easier for light to penetrate it and so the value of x is desirably set within the range of 0.1<x<0.5. This value for x can be different for the first and the third layers.

In addition, amorphous silicon and amorphous silicon carbide are the primary components but it is also possible to obtain a substantially similar effect in elements other than hydrogen are included.

Furthermore, in the previously described embodiments, the photoconductive units had either two or three photoconductive layers but the photoconductive units can have more layers than these and still be included within the scope of the present invention.

What is claimed is:

1. A high-resolution spatial-light modulator enabling high-speed response, comprising:
   electrode means formed by a transparent member and including a first electrode through which write light shines and a second electrode through which read light shines;
   a dielectric mirror between said first and said second electrodes;
   an optical modulation layer for receiving said read light, said layer being arranged between said first and second electrodes and formed of polymer dispersed liquid crystal (PDLC) material; and
   a photoconductive member for receiving said write light, said member being arranged between said first and second electrodes and formed of at least two different materials with amorphous silicon as the primary components, said member being formed with a plurality of layers and having a laminated structure with an optical sensitivity that differs between said first and second electrodes;
   said photoconductive member being configured from a first photoconductive layer that has amorphous silicon carbide as a primary component and which is formed on a side of said first electrode, a second photoconductive layer that has amorphous silicon as a primary component and which is arranged between said first photoconductive layer and said optical modulation layer, and a third photoconductive layer that has amorphous silicon carbide as a primary component and which is arranged between said second photoconductive layer and said optical modulation layer.

2. A high-resolution spatial-light modulator enabling high-speed response, comprising:
   electrode means formed by a transparent member and including a first electrode through which write light shines an a second electrode through which read light shines;
   a dielectric mirror between said first and said second electrodes;
   an optical modulation layer for receiving said read light, said layer being arranged between said first and second electrodes and formed of polymer dispersed liquid crystal (PDLC) material; and
   a photoconductive member for receiving said write light, said member being arranged between said first and second electrodes and formed of at least two different materials with amorphous silicon as the primary component, said member being formed with a plurality of layers and having a laminated structure with an optical sensitivity that differs between said first and second electrodes;
   said photoconductive member comprises at least hydrogenated amorphous silicon and hydrogenated amorphous silicon carbide, and a connection portion there between wherein the carbon content of said connection portion changes continuously.

3. A high-resolution spatial-light modulator enabling high-speed response, comprising:
   electrode means formed by a transparent member and including a first electrode through which write light shines and a second electrode through which read light shines;
   a dielectric mirror between said first and said second electrodes;
   an optical modulation layer for receiving said read light, said layer being arranged between said first and second electrodes and formed by polymer dispersed liquid crystal (PDLC) material; and
   a photoconductive member for receiving said write light, said ember being arranged between said first and second electrodes nd formed of at least two different materials with amorphous silicon as the primary component, said member being formed with a plurality of layers and having a laminated structure with an optical sensitivity that differs between said first and second electrodes;

said photoconductive member comprising hydrogenated amorphous silicon and two layers of hydrogenated amorphous silicon carbide, said amorphous silicon being sandwiched between said two layers, a first connection portion between one of said layers and said hydrogenated amorphous silicon and a second connection portion between the other of said layers and said hydrogenated amorphous silicon, wherein the carbon content of said first and second connection portions changes continuously.

4. A high-resolution spatial-light modulator enabling high-speed response, comprising:
electrode means formed by a transparent member and including a first electrode through which write light shines and a second electrode through which read light shines;
a dielectric mirror between said first and said second electrodes;
an optical modulation layer for receiving said read light, said layer being arranged between said first and second electrodes and formed of polymer dispersed liquid crystal (PDLC) material; and
a photoconductive member for receiving said write light, said member being arranged between said first and second electrodes and formed of at least two different materials with amorphous silicon as the primary component, said member being formed with a plurality of layers and having a laminated structure with an optical sensitivity that differs between said first and second electrodes;
from the side of said first electrode, said photoconductive member is successively laminated with hydrogenated amorphous silicon germanium, hydrogenated amorphous silicon, and hydrogenated amorphous silicon carbide.

5. The spatial-light modulator of claim 4, wherein said photoconductive member is a four-layer structure of hydrogenated amorphous silicon carbide, amorphous silicon hydride, hydrogenated amorphous silicon germanium and amorphous silicon carbide connected to said first electrode.

6. The spatial-light modulator of claim 4, wherein a first connection portion is disposed between said hydrogenated amorphous silicon germanium and said hydrogenated amorphous silicon in said photoconductive member, and a second connection portion is disposed between said hydrogenated amorphous silicon and said hydrogenated amorphous silicon carbide, the carbon content of said first and second portion continuously changing.

* * * * *